Patented Aug. 23, 1938

2,127,662

UNITED STATES PATENT OFFICE 2,127,662

METHOD OF FACILITATING PRODUCTION OF WELLS

John J. Grebe, Midland, Mich., assignor to The Dow Chemical Company, Midland, Mich., a corporation of Michigan No Drawing. Application September 30, 1935, Serial No. 42,879

8 Claims. (Cl. 166—21)

The invention relates to the treatment of wells, more particularly oil or gas wells, to facilitate production therefrom.

It is a common observation that the rate of production of oil or gas wells declines more or less in time. It is assumed in many cases that a decline in production is due, at least in part, to the pores and fissures in the earth becoming clogged with substances transported thereinto by the oil or gas, such as paraffin wax, earth particles, or solids deposited out of aqueous solution. In such cases it has been the practice to introduce into the well a charge of acid capable of dissolving constituents of the rock or earth formation to increase its permeability and thereby permit the oil or gas to reach the well more readily.

The direct introduction of acid into a well according to known methods, an example of which is described in U. S. Patent No. 1,877,504, however, does not always accomplish the desired degree of improvement in production. This may be the case with wells drilled into relatively porous rock, as well as with wells previously treated with acid, so that the original porosity of the rock has been greatly increased by such treatment. In such cases the acid employed follows the line of least resistance, so that the larger portion, if not all, of the acid flows into and becomes spent in the highly porous rock instead of acting upon the less porous rock in the more outlying formations from which added production might be obtained were it possible to increase its porosity. In my patent application, filed concurrently herewith, for a "Method of facilitating production of wells", Serial No. 42,880, filed September 30, 1935, (Patent No. 2,053,285), I have described an improved method of facilitating oil and gas well production in which method a quantity of gas is introduced into the formation in the presence of an aqueous solution, to which may be added a foam-producing agent, until a back pressure is built up, after which a charge of a reagent capable of increasing the permeability of the formation is introduced into the well against the pressure therein. In theory the effect of the introduction of gas in the presence of the aqueous solution containing the foam-producing agent is to build up a back pressure in the relatively porous rock, which pressure restrains or prevents the reagent subsequently introduced from entering or passing deeply into the more porous earth. Consequently, when the charge of reagent is introduced into the well against the back pressure therein and pressure is applied to the charge, the same can be forced into the less porous contiguous rock and the outlying rock to increase its permeability with greatly reduced waste of the reagent into the more porous rock. Such method has been found to bring about a greater increase in production in many cases than the conventional direct method of employing reagents in wells.

The foregoing method, however, has the disadvantage of requiring the use of a gas under relatively high pressure, which is often costly to provide. It is an object of the present invention to provide a method of the aforesaid character for facilitating production of wells in which method the reagent introduced for the purpose is restrained or prevented from entering the relatively porous earth without introducing gas ahead of the reagent. Other objects and advantages will appear as the description proceeds.

I have found that the foregoing object may be attained if, instead of introducing gas in the presence of a liquid containing a foam-producing agent, I introduce into the well a quantity of an acid solution in the presence of the foam-producing agent and then a relatively large charge of a reagent capable of increasing the permeability of the formation to the flow of fluids under sufficient pressure to be forced into the formation. According to the theory of this process the reagent so introduced forces the foam-producing agent and acid solution into the more porous portions of the formation. The acid there decomposes carbonates in the formation liberating carbon dioxide gas which in the presence of the foam-producing agent creates a foam under sufficient back pressure to seal the passages in the more porous earth. The relatively large charge of reagent introduced after the acid and foam-producing agent, as aforesaid, is thereby prevented from entering the more porous portions of the formation. Then by applying pressure to the reagent it can be forced into the less porous portions with greatly lessened or no significant loss into the more porous portions of the formation. By the foregoing process it is thus possible to increase the permeability of a relatively dense formation contiguous to a relatively porous formation and so increase production without introducing a gas under pressure to build up back pressure in the relatively porous formation. Although the foregoing method is briefly described in connection with the theory of operation of the process, I do not wish to limit the actual steps in the process by any such theory. The actual steps in the method may be carried out regardless of the theory which is only an attempt to explain the beneficial results observed. The invention, then, consists of the method hereinafter fully described and particularly pointed out in the claims.

In carrying out the invention I introduce into the well an acid solution in the presence of a foam-producing agent, which acid solution is capable of decomposing carbonates in the formation and preferably producing water-soluble salts. Hydrochloric acid solution having a concentration of HCl between 5 and 25 per cent is generally suitable, although other acids, such as nitric acid, and sulphuric acid when the formation of insoluble sulphates does not interfere, may be used. An inhibitor of the action of the acid on metals may be used with the acid to prevent damage to metal parts in the well, as described in U. S. Patent No. 1,877,504. The acid solution advantageously may contain a soluble salt or other agent capable of increasing the surface tension of water and hence capable of increasing the surface tension of the acid solution.

Suitable foam-producing agents to be employed with the acid are generally colloidal in nature or form colloidal solutions with aqueous acid solutions, so that a foam is produced when the acid acts upon limestone or other acid-soluble carbonates or mineral decomposable by acid to produce gas. Examples of such agents are gelatine, saponin, gum arabic, casein, peptone, licorice, and the like. It is preferable to mix the acid with the foam-producing agent before introducing the same into the well; however, if desired, the foam-producing agent and acid may be introduced separately, in which case they become mixed together in the well. Suitable proportions of foam-producing agent and acid solution may be ascertained by treating a piece of limestone with acid containing various amounts of foam-producing agent until a proportion is found that causes a relatively stable foam to be produced as the acid decomposes the limestone. Ordinarily an amount of agent between about 0.05 and 2 per cent of the weight of the acid is suitable, although other proportions may be used. The proportion, however, should not be so high that the mixture of acid and foam-producing agent forms a jelly or that the mixture cannot be made to flow readily on applying fluid pressure, or does not produce foam when acting upon limestone as aforementioned.

The amount of acid to be employed with the foaming agent varies according to the well and the degree of porosity of the earth. In many instances from 50 to 250 gallons is sufficient, although other amounts may be used. When the acid solution containing the foam-producing agent reaches the base of the well cavity contiguous to the producing stratum, carbonates therein are decomposed liberating carbon dioxide gas which causes foam to be produced in the well bore. The foaming acid, however, will not readily penetrate into the formation unless there is considerable pressure head upon the acid. In my U. S. Patent No. 1,989,479 I have described the use of a foam-producing agent in the presence of an acid solution in the treatment of well bores to remove acid-soluble deposits therefrom. In that treatment the foam is produced in the well bore and carries the acid upward therein because there is insufficient pressure head to force the foam into the formation. In the present process the foaming acid is forced into the formation so as to produce the foam in the earth passages instead of in the well bore. This is accomplished by the application of sufficient pressure to the foaming acid to force it into the earth formation, which pressure may be created in most cases on introducing into the well the reagent capable of increasing the permeability of the formation as in the next step of the present process.

After introducing the acid solution and foam-producing agent I introduce a charge of a reagent capable of increasing the permeability of the formation to the flow of fluids in sufficiently large amount to act upon a relatively large area of the producing horizon. The kind of reagent to be employed depends upon the nature of the earth formation and conditions therein contributing to the previous decline, restriction, or prevention of oil or gas flow of the well. Where such difficulties are due to paraffin deposition, paraffin solvents may be used, such as carbon tetrachloride, naphtha, or other known solvents for paraffin. Acid solutions, however, will generally serve the purpose, inasmuch as these can be used to dissolve acid-soluble constituents from the earth and thereby increase the flow capacity of passages or channels therein regardless of the presence of paraffin. Hydrochloric acid solutions are particularly effective where the formation is composed of or contains substantial amounts of limestone, dolomite, or other acid-soluble material. It is preferable to dilute the acid with sufficient water to permit retaining in solution the salt or salts formed by the action of the acid on the earth formation. Hydrochloric acid having a concentration between 4 and 22 per cent is suitable, although other concentrations may be used, to which acid may be added an inhibitor as in conventional practice. Such reagents may be used in amount from 500 to 2000 gallons or more. The reagent is then forced out of the well into the earth formation by its own hydrostatic head or by applying pressure, if necessary, by forcing either gas or liquid into the well after the reagent. The reagent so introduced carries the foam-producing agent into the porous portions of the formation. The well may be closed in for a period of time to permit the reagent to complete its action upon the earth formation then the pressure may be released. After the treatment the well may be put back into production by pumping or the like, or by allowing the well to flow.

In brief the treatment contemplated by my process comprises introducing into the well and thence into the earth formation an acid solution in the presence of a foam-producing agent, whereby foam is produced in the relatively porous portions of the formation which foam resists displacement by fluid pressure. Thereafter a charge of a reagent capable of increasing the permeability of the formation to the flow of fluids is introduced under sufficient pressure to be forced into the formation. The reagent follows the line of least resistance and thus passes into the less porous rock not sealed with foam. Consequently it is possible to treat wells with a smaller charge of reagent than is usually employed, the reagent may be forced for considerable distances beyond the immediate vicinity of the well bore and thereby increase the flow channels leading to productive rock, and waste of reagent is to a large extent prevented, as it is restrained from entering the relatively porous and usually non-productive rock in the more immediate vicinity of the well bore.

Other modes of applying the principle of my invention may be employed instead of those explained, change being made as regards the method herein disclosed, provided the steps stated by any of the following claims or the equivalent of such stated steps be employed.

I therefore particularly point out and distinctly claim as my invention:—

1. In a method of treating a well in a formation containing carbonate, the steps which consist in introducing into the well an initial quantity of an acid solution and a foam-producing agent, said solution being capable of acting on carbonate to liberate a gas, and then introducing a separate charge of a reagent capable of increasing the permeability of the earth formation to the flow of fluids, said reagent being substantially free from a foam-producing agent and under sufficient pressure to be forced into the formation.

2. In a method of treating a well in a formation containing carbonate, the steps which consist in introducing into the well an initial quantity of an acid solution and a foam-producing agent, said solution being capable of acting on carbonate to liberate a gas, and then introducing a separate charge of a reagent capable of increasing the permeability of the earth formation to the flow of fluids and substantially free from a foam-producing agent, and applying sufficient pressure to the charge to force it into the formation.

3. In a method of treating a well in a formation containing carbonate, the steps which consist in introducing into the well an initial quantity of hydrochloric acid solution and a foam-producing agent, said solution being capable of acting on carbonate to liberate a gas, and then introducing a separate charge of a reagent capable of increasing the permeability of the earth formation to the flow of fluids, said reagent being substantially free from a foam-producing agent and under sufficient pressure to be forced into the formation.

4. In a method of treating a well in a formation containing carbonate, the steps which consist in introducing into the well an initial charge of an acid solution containing a foam-producing agent, said solution being capable of acting on carbonate to liberate a gas, and then introducing a separate charge of a reagent capable of increasing the permeability of the earth formation to the flow of fluids, said reagent being substantially free from a foam-producing agent and under sufficient pressure to be forced into the formation.

5. In a method of treating a well in a formation containing carbonate, the steps which consist in introducing into the well an initial charge of an acid solution containing a foam-producing agent, said solution being capable of acting on carbonate to liberate a gas, and then introducing a separate charge of a reagent comprising hydrochloric acid, said reagent being substantially free from a foam-producing agent and under sufficient pressure to be forced into the formation.

6. In a method of treating a well in a formation containing carbonate, the steps which consist in introducing into the well an initial charge of an acid solution containing a foam-producing agent, said solution being capable of acting on carbonate to liberate a gas, and then introducing a separate charge of a reagent capable of increasing the permeability of the earth formation to the flow of fluids and substantially free from a foam-producing agent, and applying sufficient pressure to the charge to force it into the formation.

7. In a method of treating a well in a formation containing carbonate, the steps which consist in introducing into the well an initial charge of an acid solution containing gum arabic, said solution being capable of acting on carbonate to liberate a gas, and then introducing a separate charge of a reagent comprising hydrochloric acid, said reagent being substantially free from a foam-producing agent and under sufficient pressure to be forced into the formation.

8. In a method of treating a well in a formation containing carbonate, the steps which consist in introducing into the well an initial charge of an acid solution containing a foam-producing agent and an agent capable of increasing the surface tension of water, said solution being capable of acting on carbonate to liberate a gas, then introducing a separate charge of a reagent capable of increasing the permeability of the formation to the flow of fluids, said reagent being substantially free from a foam-producing agent and under sufficient pressure to be forced into the formation.

JOHN J. GREBE.